United States Patent
Bader

(10) Patent No.: US 8,849,110 B2
(45) Date of Patent: Sep. 30, 2014

(54) OPTICAL NODE

(75) Inventor: Attila Bader, Paty (HU)

(73) Assignee: Telefonaktiebolaget LM Ericsson, Stockholm (SE)

( * ) Notice: Subject to any disclaimer, the term of this patent is extended or adjusted under 35 U.S.C. 154(b) by 1359 days.

(21) Appl. No.: 12/599,361

(22) PCT Filed: Jun. 29, 2007

(86) PCT No.: PCT/EP2007/056610
§ 371 (c)(1),
(2), (4) Date: Sep. 13, 2010

(87) PCT Pub. No.: WO2008/138402
PCT Pub. Date: Nov. 20, 2008

(65) Prior Publication Data
US 2010/0329674 A1    Dec. 30, 2010

Related U.S. Application Data

(60) Provisional application No. 60/917,145, filed on May 10, 2007.

(51) Int. Cl.
*H04J 14/00* (2006.01)

(52) U.S. Cl.
USPC .................................. 398/45; 398/49; 398/51

(58) Field of Classification Search
None
See application file for complete search history.

(56) References Cited

U.S. PATENT DOCUMENTS 5,278,689 A * 1/1994 Gitlin et al. ..................... 398/54
5,739,933 A    4/1998 Dembeck et al.

(Continued)

FOREIGN PATENT DOCUMENTS

| JP | 01 229545 | 9/1989 |
| JP | 09 121372 | 5/1997 |
| JP | 10 190579 | 7/1998 |

OTHER PUBLICATIONS

Blumenthal D.J. et. al. Proceedings of the IEEE, vol. 82, No. 11, Nov. 1994, pp. 1650-1667.*

(Continued)

*Primary Examiner* — Ken Vanderpuye
*Assistant Examiner* — Merlin Brito Peguero
(74) *Attorney, Agent, or Firm* — Nixon & Vanderhye, P.C.

(57) ABSTRACT

A module for routing packets of first and second optical signals comprising first and second inputs (A,B) for receiving the first and second optical signals and first and second outputs (C,D) for the optical signals. The module comprises optical switching means (8) for switching the first optical signal and the second optical signal to either one of the two outputs (C,D), and a correlator module (7). The correlator module comprises at least two optical correlators (9,10,11, 12). The correlator module (7) is arranged to generate control signals for controlling the switching means (8) based on destination data in packets of the first and second signals such that if packets of the first and second optical signals overlap, the switching means directs the packet that was received first to the output (C,D) indicated by the destination data of that packet and the overlapping subsequent packet is directed to the other output (C,D) or blocked. A module is advantageous because there is no need to convert the optical signal to the electronic domain and packet contention is avoided without synchronisation or scheduling of the packets of the optical signals because, for overlapping packets, the packet that is received first is given priority with the later packet either sent to the other output, whether or not this is the correct output for the packet, or blocked.

19 Claims, 7 Drawing Sheets

(56) References Cited

U.S. PATENT DOCUMENTS

| | | | |
|---|---|---|---|
| 6,396,602 B1 | 5/2002 | Kaiser et al. | |
| 6,665,495 B1* | 12/2003 | Aicklen et al. | 398/54 |
| 7,177,544 B1* | 2/2007 | Wada et al. | 398/51 |
| 2005/0047392 A1* | 3/2005 | Ashwood Smith | 370/351 |
| 2007/0201877 A1* | 8/2007 | Epps et al. | 398/154 |
| 2009/0129775 A1* | 5/2009 | Handelman | 398/47 |

OTHER PUBLICATIONS

Prucnal, P.R., "Optically processed self-routing, synchronization, and contention resolution for 1-D and 2-D photonic switching architectures," Quantum Electronics, IEEE Journal of, vol. 29, No. 2, pp. 600-612, Feb. 1993.*

Prucnal, P.R., "Optically processed self-routing, synchronization, and contention resolution for 1-D and 2-D photonic switching architectures," Quantum Electronics, IEEE Journal of, vol. 29, No. 2, pp. 600,612, Feb. 1993.*

Lisong Xu; Perros, H.G.; Rouskas, G., "Techniques for optical packet switching and optical burst switching," Communications Magazine, IEEE, vol. 39, No. 1, pp. 136,142, Jan. 2001.*

Summary of Japanese official action, Feb. 7, 2011, in corresponding Japanese Application No. JP 2010-506809.

Brief summary of JP 01-229545, Japanese Patent Application No. 2010-506809.

International Search Report for PCT/EP2007/056610, mailed Apr. 4, 2008.

Prucnal, P.R. et al., "Optically Processed Self-Routing, Synchronization, and Contention Resolution for 1-D and 2-D Photonic Switching Architectures", IEEE Journal of Quantum Electronics, vol. 29, No. 2, (Feb. 1, 1993), pp. 600-612.

Bogoni et al., "OTDM-Based Optical Communications Networks at 160 Gbit/s and Beyond", Optical Fiber Technology, vol. 13, No. 1, (Dec. 9, 2006), pp. 1-12.

Teixeira, A et al, "All Optical Router Based on OCDMA Codes and SOA Based Devices", Transparent Optical Networks 2005, (Jul. 3, 2005), pp. 183-188.

Yang, Q. et al., "Traffic Control and WDM Routing in the DAT Vortex Packet Switch", IEEE Phonics Technology Letters, vol. 14, No. 2, (Feb. 2002), pp. 236-238.

Wang, T-S, "Architectural Evolution and Principles of Optical Terabit Packet Switches (OTPS)", Computer Communications, vol. 25, No. 6, (Apr. 1, 2002), p. 557-576.

Matera, F. et al., "Proposal of an all Optical Shuffle Multihop Network", European Transactions on Telecommunications and Related Technologies, vol. 4, No. 2, (Mar. 1, 1993), pp. 97-103.

* cited by examiner

OPTICAL NODE

This application is the U.S. national phase of International Application No. PCT/EP2007/056610 filed 29 Jun. 2007, which designated the U.S. and claims the benefit of U.S. Provisional No. 60/917,145 filed 10 May 2007, the entire contents of each of which are hereby incorporated by reference.

BACKGROUND

This invention concerns a module for routing optical signals and a system and node comprising these modules. The invention has particular, but not exclusive, application to a module, system and node for routing optical signals that avoids the need for synchronisation and scheduling of optical packets of the optical signals.

Metro Ethernet and optical access networks are packet switched networks, allowing the multiplexing of traffic of several users, without preliminary resource allocation in the system. In these networks, although the transmission is optical, routing of the packets is carried out by electronic switches which require optical-to-electrical conversion of the optical signal. These switches form a bottleneck in the network.

It is desirable to provide optical routing of packets to remove the bottleneck. However, in order to avoid packet contention and packet loss, classical electrical switching solutions use input and output buffers and schedulers. Optical buffers and schedulers are difficult to realise because of the limited processing capability of optical components and lack of optical random access memory.

SUMMARY

According to a first aspect of the invention there is provided a module for routing packets of first and second optical signals comprising:—
first and second inputs for receiving the first and second optical signals and first and second outputs for the optical signals,
optical switching means for switching the first optical signal and the second optical signal to either one of the two outputs,
a correlator module comprising at least two optical correlators, the correlator module arranged to generate control signals for controlling the switching means based on destination data in packets of the first and second signals such that if packets of the first and second optical signals overlap, the switching means directs the packet that was received first to the output indicated by the destination data of that packet and the overlapping subsequent packet is directed to the other output or blocked.

It will be understood that the meaning of the term "module" as used herein is not intended to be limited to a self-contained unit, but the module could also be part of a larger more complex structure.

A module according to the invention is advantageous because there is no need to convert the optical signal to the electronic domain. In this way, delays resulting from the routing may be reduced. Furthermore, packet contention can be avoided without synchronisation or scheduling of the packets of the optical signals because, for overlapping packets, the packet that is received first is given priority with the later packet either sent to the other output, whether or not this is the correct output for the packet, or blocked.

It will be understood that "optical switching means" means a device that can route optical signals to one of at least two outputs without converting the optical signals to an electronic signal, i.e. switching is carried out in the photonic domain.

In one arrangement, the optical switching means comprises a first optical switch and a second optical switch, the first optical switch arranged to direct packets of the first optical signal to one of the first and second outputs and the second optical switch arranged to direct packets of the second optical signal to one of the first and second outputs.

It will be understood that "optical switch" as used herein means a device that can direct one optical signal from an input to one of at least two outputs without converting the optical signal to an electronic signal.

Optical switches are known. These are based on the principal that, in a non-linear material such as chalcogenide glasses, a light beam with sufficient intensity changes the optical properties of the material, which, in turn, affects another light beam propagating through the material causing this other light beam to change direction.

A similar effect can be achieved by active optical elements, such as semiconductor optical amplifiers (SOAs), where the self-induced gain modulation leads to strong non-linear transmittance. An example of such a device based on a SOA is described in "A novel and fast optical switch based on two cascaded Terahertz Optical Asymmetric Demultiplexers" Bing C. Wang, Varghese Baby, Wilson Tong, Lei Xu, Michelle Friedman, Robert J. Runser, Ivan Glesk, Paul R. Prucnal, OPTOCS EXPRESS, Vol. 10. No. 1/page 15, 14 Jan. 2002.

Each optical switch may be a mono-stable switch that reverts back to an original condition after a preset period of time. A mono-stable switch is advantageous as it avoids the need for additional circuitry to make the switch revert to its original condition. However, in an alternative arrangement, the optical switches are bi-stable and the module further comprises electronic circuitry that causes the bi-stable optical switch to revert back to an original condition after a preset period of time. The preset period of time may be the maximum allowed length for a packet in a network in which the module is to be incorporated. In this way, the switch remains in the required condition until the packet has been transmitted no matter how long the packet is.

The correlator module may be arranged to generate control signals to cause the optical switches to direct one of the first and second signals to one of the outputs and the other of the first and second switches to the other output when overlapping packets are received. The correlator module is arranged to output such control signals regardless of whether or not the later received packet of the overlapping packets is meant to be routed to the other output.

Each correlator of the correlator module may compare destination data in packets received at one of the inputs to an expected bit pattern associated with one of the output and generates a control signal if the destination data matches the expected bit pattern.

The correlator module may comprise, for each input, a set of correlators, one for each output, wherein the set of correlators comprises a correlator for comparing destination data of packets received at that input to an expected bit pattern associated with the first output and a further correlator for comparing destination data of packets received at that input to an expected bit pattern associated with the second output.

The control signals may be optical signals.

The correlator module may comprise a blocking switch that blocks a control signal generated by the correlators from reaching the optical switches if the control signal opposes a control signal generated as a result of an earlier (first) packet that is considered as being currently transmitted by the module.

A packet may be considered as currently being transmitted by the module if the time since receiving the packet is less than the maximum possible packet length of the network in which the module is to be incorporated. Alternatively, the module may be arranged to determine the actual transmission time for a packet, for example by determining the length of the packet, and the packet is considered as being currently transmitted for the actual time it takes the packet to be transmitted through the module.

The blocking switch may be switchable between two conditions, in one condition, the blocking switch blocks control signals that would cause the switching means to direct first optical signals to the second output and second optical signals to the first output and, in the other condition, the blocking switch allows control signals that cause the switching means to direct first optical signals to the second output and second optical signals to the second output to pass to the switching means.

The blocking switch may be held in each condition for the maximum possible packet length of the network in which the module is to be incorporated before the blocking switch can be switched to the other condition.

The switching means may be connected to the first and second outputs by optical links and the optical links for directing the first optical signal to the second outlet and the second optical signal to the first outlet delay the signals transmitted therein relative to the optical links directing the first optical signal to the first outlet and the second optical signal to the second outlet.

The delay may be equal to the maximum possible packet length of the network in which the module is incorporated.

According to a second aspect of the invention there is provided a module for routing packets of first and second optical signals comprising:—
  first and second inputs for receiving the first and second optical signals and first and second outputs for the optical signals,
  a first optical switch for switching the first optical signal to either one of the two outputs and a second optical switch for switching the second optical signal to either one of the two outputs, the optical switches connected to the outputs by optical links,
  wherein the optical link that connects the first optical switch to the second output delays packets transmitted therein relative to the transmission of packets along the optical link that connects the second optical switch to the second output and the optical link that connects the second optical switch to the first output delays packets transmitted therein relative to the transmission of packets along the optical link that connects the first optical switch to the first output.

By having optical links that delay packets of the optical signals, it may be possible to switch overlapping packets to the same output without creating a contention.

Preferably, the relative delay in the optical links is equal to the maximum length of a packet. In this way, if overlapping packets are received at the inputs, these overlapping packets can be sent to the same output without causing a contention between the packets.

According to a third aspect of the invention there is provided a switching system for routing optical signals in an optical network comprising a first for routing packets of first and second optical signals comprising first and second inputs for receiving first and second optical signals and optical switching means for switching the first optical signal and the second optical signal to either one of a first and a second input of a second module according to the second aspect of the invention, the second module arranged to route the first and second optical signals to one of first and second outputs.

A switching system according to the third aspect of the invention routes packets of the first and second optical signals to the desired output using the first module if there is no overlap between the packets. However, if there is an overlap between the packets, the first module directs the packet that is received first (the first packet) to the required output and any subsequently received, overlapping packet (the second packet) to the other output regardless whether or not this is the correct output. The second module, then directs the second packet to the desired output, contention with the first packet being avoided as the second packet is delayed in the second module.

In one embodiment, the first module is a module according to the first aspect of the invention.

It will be understood, that even though the second module prevents packet contention between the first and second packets, delay of the second packet could cause contention with a third packet received after the second packet. Therefore, in one arrangement, the node comprises one of more further modules according to the second aspect of the invention, these further modules concatenated with the each other and the first and second modules such that the outputs of all but the last module of the concatenation feeds into the input of the next module. Providing further modules further reduces the likelihood of a contention between packets.

According to a fourth aspect of the invention there is provided a node comprising a modules according to the first or second aspect of the invention or a switching system of the third aspect of the invention in a Banyan or crossbar arrangement.

An embodiment of the invention will now be described, by example only, with reference to the accompanying drawings, in which:—

DETAILED DESCRIPTION

Figure 1:
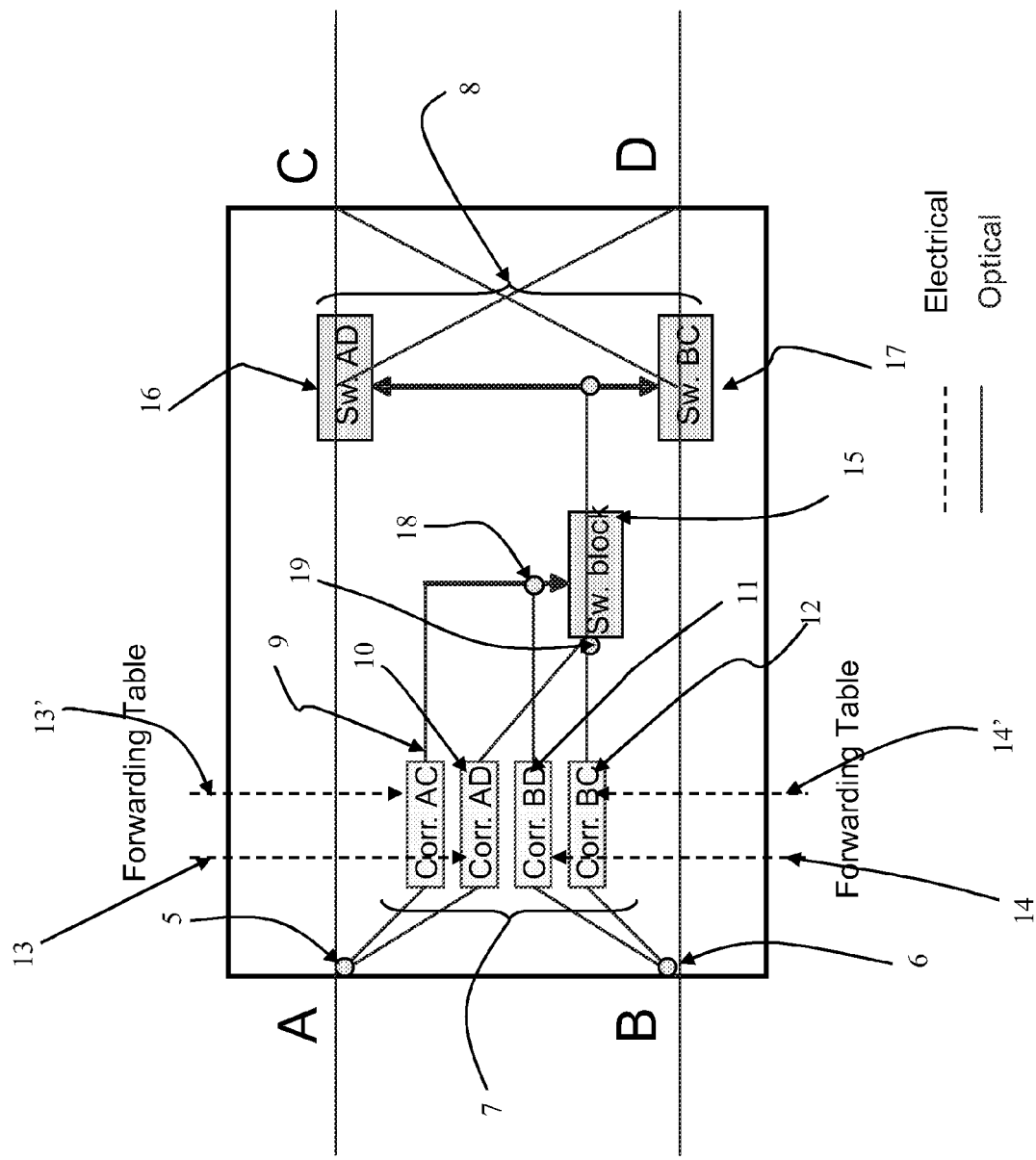
FIG. 1 shows a schematic view of a module according to a first embodiment of the invention.

Referring to FIG. 1, a switching module according to an embodiment of the invention switches packets of first and second optical signals received at first and second inputs A and B respectively to first a second outputs C and D. Each packet comprises a header including destination data (a bit pattern) that indicates the destination for the packet.

The switching module comprises an optical coupler 5,6 for each input A,B. Each optical coupler 5,6 divides the incoming optical signal into three parts, directing two of the parts to a correlator module 7 and the other resultant optical signal to switching means 8.

Switching means 8 comprises optical switches 16,17 controlled by control signals from correlator module 7. Optical switch 16 can be switched between two conditions one directing the first optical signal to output C and the other directing the first optical signal to output D. Optical switch 17 can be switched between two conditions one directing the second optical signal to output D and the other directing the second optical signal to output C. In this embodiment, the optical switches are mono-stable, switching back to the original switching condition (i.e. wherein optical switch 16 directs the first optical signal to the first output C and optical switch 17 directs the second optical signal to the second output D) after a set period of time, typically a period long enough to allow a packet having the maximum allowed packet length to be switched therethrough.

Figure 2:
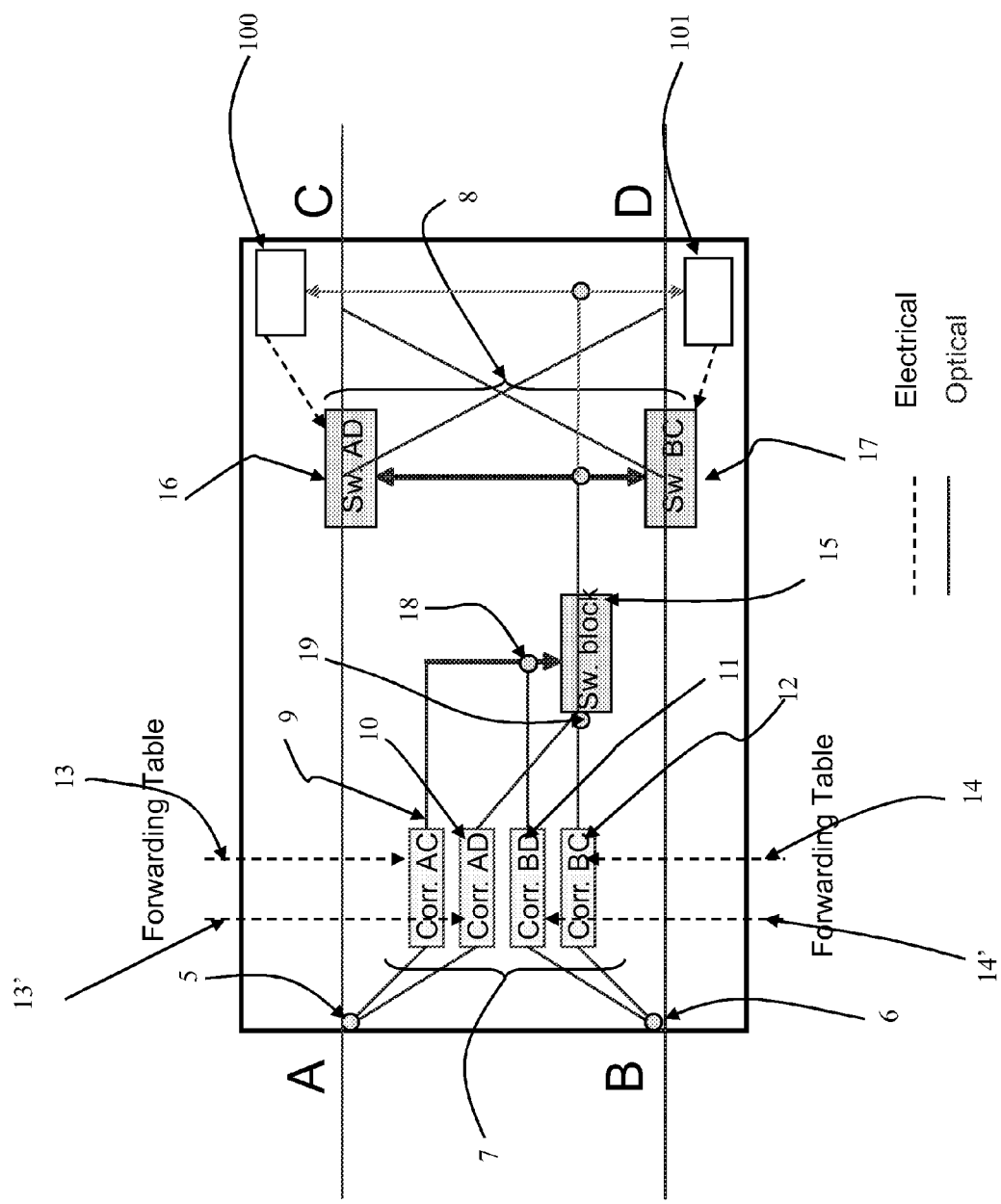
FIG. 2 shows a schematic view of a module a according to a second embodiment of the invention.

However, in another embodiment, shown in FIG. 2, the optical switches are bi-stable switches that need an external trigger to revert back to its original state, wherein an electrical circuits 100, 101 are provided which restore the optical switches 16,17 back to the original switching condition. The electrical circuit 100,101 comprises a timer that after a time period restores the bistabile switch into the original state. The advantage of the bi-stabile switch is that the switching time can be adjusted more easily by adjusting the timer of the electrical circuits 100,101 whereas for monostable the switching time is usually not adjustable.

The correlator module 7 comprises four optical correlators 9, 10, 11 and 12, optical correlators 9 and 10 receiving the first optical signal and optical correlators 11 and 12 receiving the second optical signal.

Optical correlators are well known and are used to compare two optical signals using an optical device with Fourier transforming properties (interferometers) or simply combining light intensities, such as a lens, mirror or waveguide. In this embodiment, optical correlators 9 and 12 compare the bit pattern of the destination data of the incoming packet to an expected bit pattern indicating that the packet should be routed to output C. Optical correlators 10 and 11 compare the bit pattern of the destination data of the incoming packet to an expected bit pattern indicating that the packet should be routed to output D. The optical correlators 9, 10, 11, 12 generate control signals if the comparison reveals that the bit pattern of the destination data and the expected bit pattern is the same.

Each correlator is programmed by forwarding table signals 13, 13', 14, 14'. The exact way the correlator is programmed will depend on the type of correlator. For example, if the correlator comprises mirrors, the forwarding table signals 13, 13', 14, 14' will cause the distance between the lens, mirrors or the length of the waveguide to change so as to change the light path in one arm of the correlator. In this way, the correlators can be reprogrammed if the expected bit pattern associated with an output C, D changes.

The correlator module 7 further comprises a blocking switch 15. Control signals generated by correlators 9 and 11 are coupled together by optical coupler 18 which then directs the control signal to blocking switch 15. Control signals generated by correlators 10 and 12 are coupled together by optical coupler 19 which then directs the control signal to blocking switch 15.

Blocking switch 15 is an optical switch that allows or blocks the control signals from correlators 10 and 12 to pass therethrough to optical switches 16, 17 of switching means 18. Switching of the blocking switch 15 is controlled by the control signals generated by correlators 9 and 11.

The blocking switch 15 is a mono-stable optical switch that in its normal condition allows control signals from correlators 10 and 12 to pass therethrough to switches 16,17 but can be switched to another condition in which it blocks control signals from correlators 10 and 12 in response to the received control signals from correlators 9 and 11. On being switched from its normal condition, the switch 15 is held in that condition for the maximum possible length of a packet after which it reverts back to its normal position. It will be understood that in an alternative embodiment, the optical blocking switch 15 is a bi-stable switch that is caused to revert back to the normal position by electronic circuitry (like the optical switches 16,17 of the embodiment shown in FIG. 2).

When a control signal from correlators 10 or 12 reaches optical switches 16,17, it causes optical switch 16 to direct the first optical signal to output D and optical switch 17 to direct the second optical signal to output C.

In this embodiment, blocking switch 15 is the same type of switch as optical switches 16 and 17 but with one output port blocked. If there is no control signal from correlator 9 or 11, any control signal from correlator 10 or 12 passes to the unblocked output, whereas when the blocking switch 15 is switched from its normal condition, any control signal from correlator 10 or 12 passes to the blocked output.

In operation, a first packet is received at input A or B. This packet is divided into three identical parts by optical coupler 5 or 6. One part is directed to optical switch 16,17, another part is directed to correlator 9, 11 and the final part is directed to correlator 10,12.

Correlator 9,12 compares destination data in the header of the first packet to a bit pattern (address) corresponding to output C and correlator 10,11 compares the header of the first packet to a bit pattern (address) corresponding to output D. If the destination data matches the bit pattern associated with output C, the correlator 9,12 generates a control signal, whereas if the destination data matches the bit pattern associated with output D, correlator 10,11 generates a control signal.

If the first packet causes a control signal to be generated by correlator 9 or 11, this control signal causes blocking switch 15 to switch to a condition blocking control signals from the correlators 10 and 12. The optical switches 16,17 remain in the original condition and direct the first packet to output C if it is received at input A and to output D if it is received at input B. If the first packet causes a control signal to be generated by correlators 10 and 12 then these are allowed to pass through the blocking switch to optical switches 16,17 and cause the optical switches 16,17 to direct the first packet to output D if it is received at input A and to output C if it is received at input B.

If a second packet is received at the other input A,B after the first packet but during transmission of the first packet (an overlapping packet), this packet is divided into three identical parts by optical coupler 5 or 6 and sent to the other optical correlators 9, 10, 11, 12 and the other optical switch 16,17. In a similar manner as for the first packet, the optical correlators 9, 11 and 10,12 compare the destination data of the second packet to the bit patterns for the outputs C,D and generate a control signal dependent on which bit pattern the destination data matches. This control signal is sent to blocking switch 15.

If the destination data of the second packet indicates that the second packet should be routed to the opposite output to the first packet, then the control signal generated by the correlator either maintains the blocking switch 15 or optical switches 16,17 in the same condition. However, if the destination data of the second packet indicates that the second packet should be routed to the same output to the first output, then the generated control signal does not cause the optical switches to change condition because the blocking switch is held in its current condition for the maximum possible length of a packet or the control signal is blocked from reaching the optical switches 16,17 by blocking switch 15.

The operation of the module ensures that for overlapping packets, the packet that arrives first at the input of the switching module is always switched to the desired output C,D and a later packet is switched to the desired output if it does not collide with the first packet, otherwise the later packet is switched to the other output C,D. The advantage of the module, is that the module can handle packets that arrive in any order whilst avoiding collisions between packets. There is no need for the synchronisation and scheduling of packets, which would introduce additional complexity into an optical network.

If the second packet has a length that extends beyond an end of the first packet, cutting of the tail of the second packet can occur. This could be avoided with the introduction of further elements to the module but in the preferred embodiment such additional logic is avoided to reduce complexity. The module saves those packets that fit in the time frame of the switching time of the module, the packets that are cut being lost. There will be an optimum switching time that reduces the packet loss due to cutting of packets. It is believed that for most systems this is the maximum possible packet length or may be a bit longer.

In an alternative embodiment, rather than directing the overlapping, colliding packet to the opposite output C,D to the desired destination, the packet may be blocked by the module and have to be sent at a later time.

Figure 3:
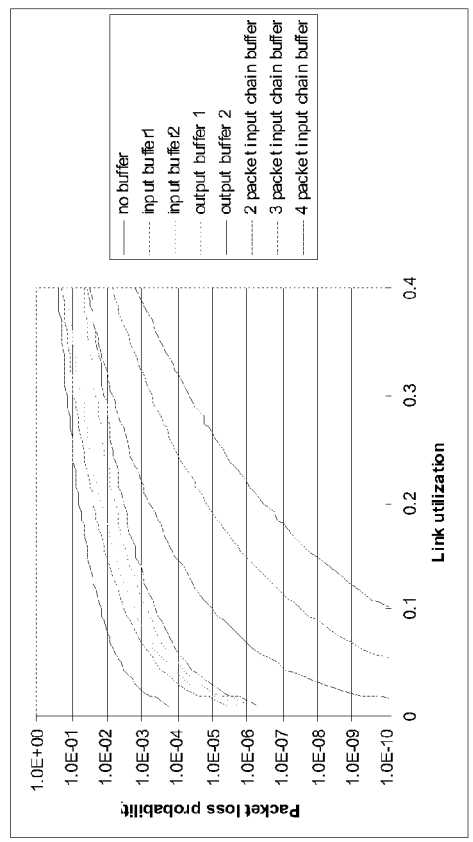
FIG. 3 is a graph of link utilization vs. packet loss probability for different buffering solutions.
Figure 3:
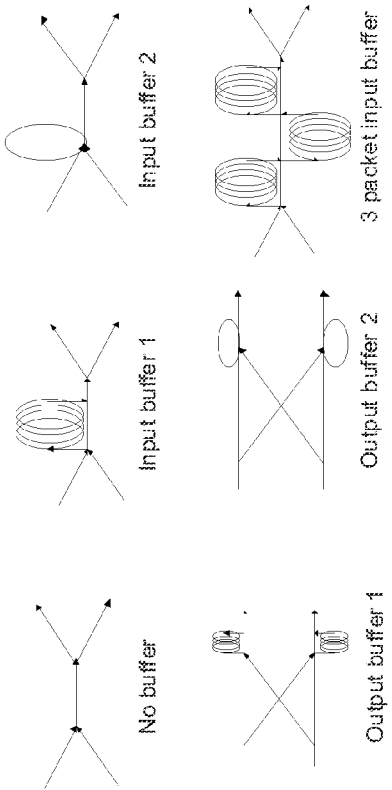

The probability of packets overlapping depends on the utilisation of an optical link. This is shown in FIG. 3. In FIG. 3, the calculated probability of a lost packet is shown for different buffering solutions in a 2×2 switching element (packets are assumed lost if they arrive overlapped at the inputs of the switching element). In these simple calculations asynchronous packet arrival with uniform distribution and fixed packet size were assumed. The packet arrival rates were the same for both inputs. FIG. 3 shows graphs for a bufferless switch, and for switches having different input buffer arrangements, as shown in FIG. 3. Input buffer 1 represents a switched delay line with fixed length. Input buffer 2 represents a buffer that is read out if an output is free, otherwise the packet is stored for an additional time period. The other buffering arrangements consist of combinations of these two basic buffering arrangements at the inputs and/or outputs of the 2×2 switch.

As can be seen from the Figure, without a buffer, or using a one a packet long buffer, accepatable packet loss probability can be achieved only at very low link utilisation. Using 3-4 packet long buffers with multiple readout possibility, the packet collision probability can be decreased below $10^{-6}$. These results are expected to be worse when traffic arrives in bursts.

The switching module described with reference to FIGS. 1 and 2, correspond to the scenario wherein there is no buffer. Accordingly, using a single module on its own can only achieve acceptable packet loss ratio when there is very low link utilisation.

To decrease the packet loss ratio, the module described with reference to FIGS. 1 and 2 can be concatenated with a module that will now be described with reference to FIG. 4.

Figure 4:
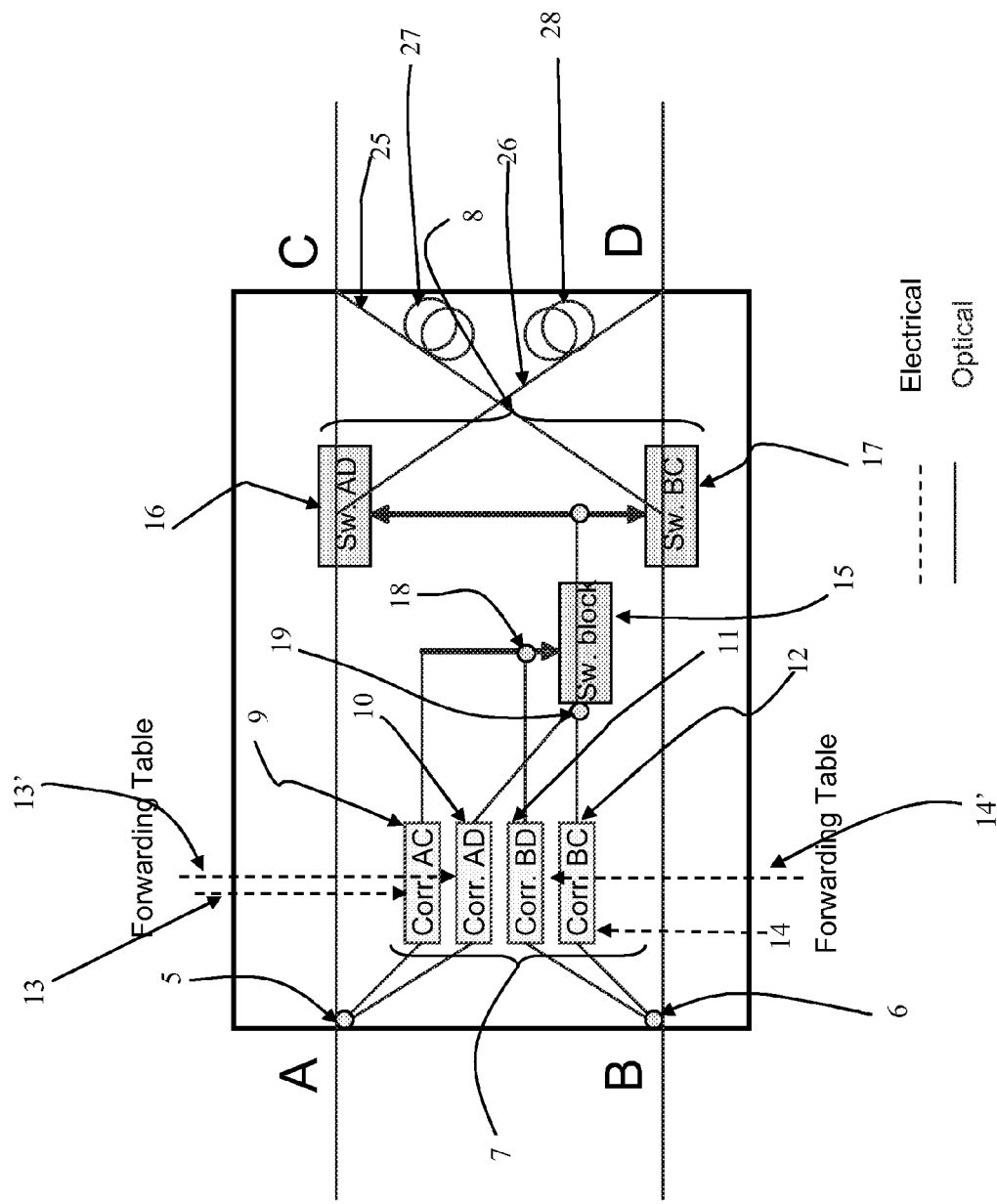
FIG. 4 is a schematic view of a module according to a third embodiment of the invention.

The module of FIG. 4 is similar to the module of FIG. 1 with the same parts being given the same reference numerals. However, this module differs in that optical lines 25,26 linking optical switch 16 to output D and optical switch 17 to output C are provided with a delay line 27,28. In this embodiment, the length of the delay line 27,28 is the maximum possible packet length. As a consequence of the delay lines 27,28, the switching times of the optical switches 16,17 has to be longer, typically the propagation time for a packet along the optical lines 25,26. The timing and switching times should be aligned correctly.

Figure 5:
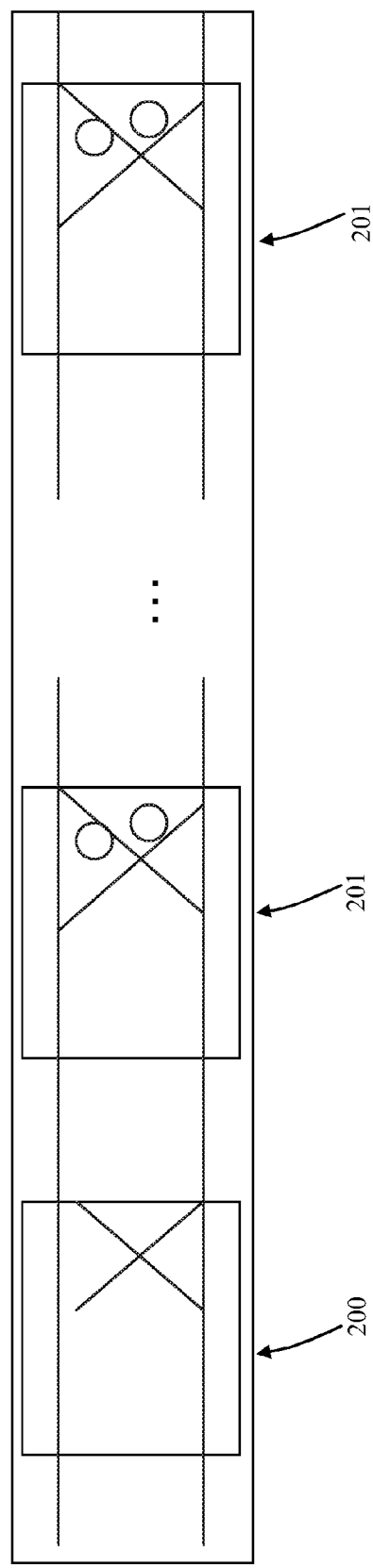
FIG. 5 is a schematic view of a switching system according to the invention comprising concatenated modules.

FIG. 5 shows a switching system wherein one or more of the modules 201 shown in FIG. 4 are concatenated with the module 200 shown in Figures 1 or 2, such that the second or higher stage modules 201 switch those packets to the desired output that it was not possible to switch with the first module. Collisions of these packets are avoided because the delay lines 27,28 in modules 201 delay the packets. The probability of a contention and therefore packet loss decreases rapidly with the number of stages. This is shown in FIG. 6.

To achieve an acceptable packet loss ratio (e.g. $10^{-6}$ for a typical network) 3-4 stages can be used.

Figure 6:
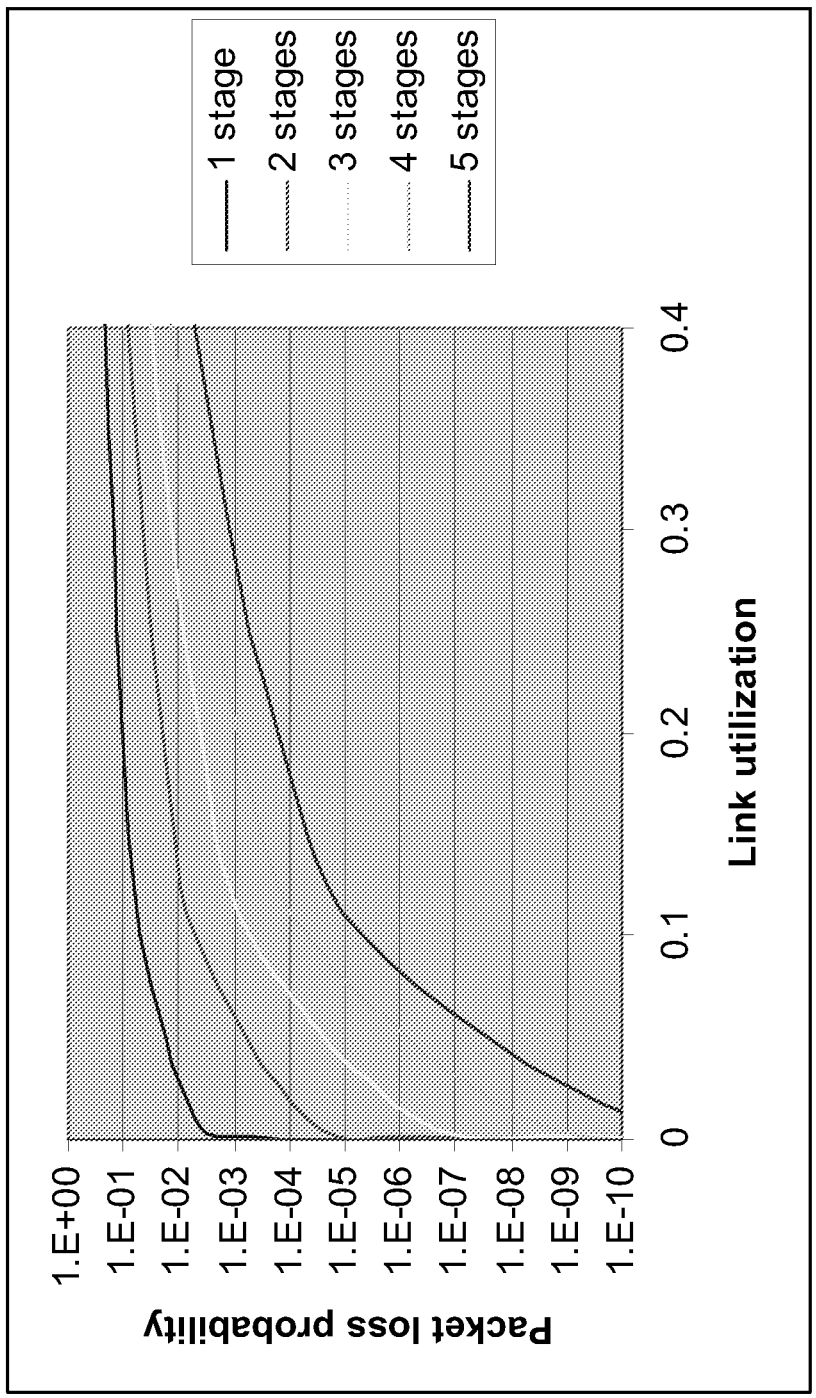
FIG. 6 is a graph of link utilisation vs. packet loss probability for systems according to the invention having different numbers of modules.

An advantage of the system of FIG. 6 is that that system consists of a chain of similar modules that can be fabricated in large quantities.

Note that contention does not need to be treated separately for each module/system but it is possible to apply the principle of deflection routing, which means that if contention occurs in a module/system resulting in a packet not being switched to the desired output but to the other output, it may be possible to route this packet to the desired destination in using another module/system in a optical network.

Figures 7, 8:
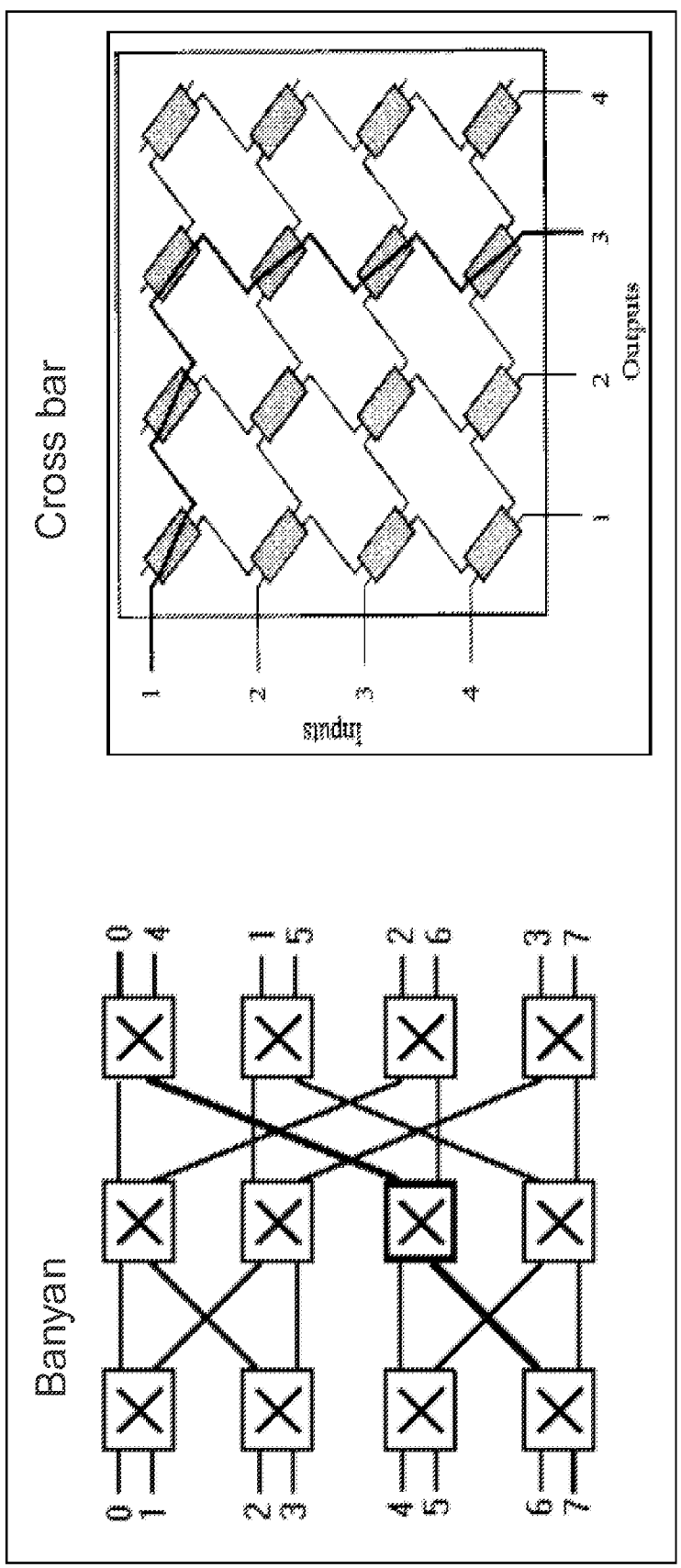
FIG. 7 is a series of switching systems according to the invention in a Banyan type arrangement.
FIG. 8 is a series of switching systems according to the invention in a crossbar type arrangement.

It is common for nodes in an optical network to comprise a Banyan or crossbar type switch as shown in FIGS. 7 and 8, respectively. Such nodes can be built using modules and/or systems of the invention.

It will be understood that the invention is not intended to be limited to the above-described embodiment but modifications and alterations can be made to the invention without departing from the scope of the invention defined in the claims.

The invention claimed is:

1. A module for routing asynchronously arriving packets of first and second optical signals comprising:
    first and second inputs configured to receive, respectively, a first optical signal and a second optical signal that is asynchronously received with respect to the first optical signal, the first and second optical signals including packets with destination data;
    first and second outputs configured to output the first and/or second optical signals;
    at least one optical switch configured to switch the first optical signal and the second optical signal to one of the first and second outputs; and
    a correlator module comprising at least two optical correlators, each of the correlators being configured with an expected bit pattern associated with one of the first and second outputs, the correlator module configured to generate control signals to control the optical switch device based on the destination data,
    wherein each optical correlator of the correlator module is configured to:
        compare destination data in packets received at one of the first and second inputs to a destination pattern that is the expected bit pattern associated with one of the first and second outputs; and
        generate a control signal if the destination data matches the expected bit pattern, and the correlator module is configured to generate the control signal such that if packets of the first and second optical signals overlap, the optical switch device is configured to:

direct the packet that was received first at the first or second input to the output indicated by the destination data of that packet; and direct the overlapping subsequent packet of the first and second optical signals to the other output or to be blocked.

2. A module according to claim 1, wherein the optical switch comprises a first optical switch and a second optical switch, the first optical switch arranged to direct packets of the first optical signal to one of the first and second outputs and the second optical switch arranged to direct packets of the second optical signal to one of the first and second outputs.

3. A module according to claim 2, wherein each optical switch is a mono-stable switch that reverts back to an original condition after a preset period of time.

4. A module according to claim 2, wherein the optical switches are bistable and the module further comprises electronic circuitry configured to cause the bi-stable optical switch to revert back to an original condition after a preset period of time.

5. A module according to claim 3, wherein the preset period of time is the maximum allowed length for a packet in a network in which the module is to be incorporated.

6. A module according to claim 2, wherein, when overlapping packets are received, the correlator module is arranged to output control signals to cause the optical switches to direct one of the packets to one of the outputs and the other packet to the other output.

7. A module according to claim 6, wherein the correlator module is arranged to output the control signals regardless of whether or not the later received packet of the overlapping packets is meant to be routed to the other output.

8. A module according to claim 1, wherein the correlator module comprises, for each input, a set of correlators, one for each output, wherein the set of correlators comprises a correlator for comparing destination data of packets received at that input to an expected bit pattern associated with the first output and a further correlator for comparing destination data of packets received at that input to an expected bit pattern associated with the second output.

9. A module according to claim 1, wherein the control signals are optical signals.

10. A module according to claim 1, wherein the correlator module comprises a blocking switch that blocks a control signal generated by the correlators from reaching the optical switches if the control signal opposes a control signal based on an earlier (first) packet that is considered as being currently transmitted by the module.

11. A module according to claim 10, wherein a packet is considered as currently being transmitted by the module if the time since receiving the packet is less than the maximum possible packet length of the network in which the module is to be incorporated.

12. A module according to claim 10, wherein the blocking switch is switchable between two conditions, in one condition, the blocking switch blocks control signals that would cause the at least one optical switch to direct first optical signals to the second output and second optical signals to the first output and, in the other condition, the blocking switch allows control signals that cause the at least one optical switch to direct first optical signals to the second output and second optical signals to the second output to pass to the at least one optical switch.

13. A module according to claim 12, wherein the blocking switch is held in each condition for the maximum possible packet length of the network in which the module is to be incorporated before the blocking switch can be switched to the other condition.

14. A module according to claim 1, wherein the at least one optical switch is connected to the first and second outputs by optical links and the optical links for directing the first optical signal to the second outlet and the second optical signal to the first outlet are configured to delay the signals transmitted therein relative to the optical links directing the first optical signal to the first outlet and the second optical signal to the second outlet.

15. A module according to claim 14, wherein the delay is equal to the maximum possible packet length of the network in which the module is incorporated.

16. A switching system for routing optical signals in an optical network comprising a first module for routing packets of first and second optical signals, the first module comprising first and second inputs for receiving first and second optical signals and an optical switch configured to switch the first optical signal and the second optical signal to either one of a first and a second input of a second module according to claim 14, a second module arranged to route the first and second optical signals to one of first and second outputs.

17. A system according to claim 16, wherein the first module is a module for routing packets of first and second optical signals comprising:

first and second inputs for receiving the first and second optical signals and first and second outputs for the optical signals, an optical switch configured to switch the first optical signal and the second optical signal to either one of the two outputs, a correlator module comprising at least two optical correlators, the correlator module arranged to generate control signals for controlling the optical switch based on destination data in packets of the first and second signals such that if packets of the first and second optical signals overlap, the optical switch directs the packet that was received first to the output indicated by the destination data of that packet and the overlapping subsequent packet is directed to the other output or blocked.

18. A system according to claim 16, wherein the system comprises one of more further modules, these further modules concatenated with the each other and the first and second modules such that the outputs of all but the last module of the concatenation feeds into the input of the next module.

19. A node comprising modules according to claim 1 or a switching system in a Banyan or crossbar arrangement.

* * * * *